(12) United States Patent
Arntson

(10) Patent No.: US 9,112,354 B2
(45) Date of Patent: Aug. 18, 2015

(54) DYNAMIC POWER CONTROL FOR A TWO WIRE PROCESS INSTRUMENT

(71) Applicant: Rosemount Inc., Chanhassen, MN (US)

(72) Inventor: Douglas Wayne Arntson, Maple Grove, MN (US)

(73) Assignee: Rosemount Inc., Eden Prairie, MN (US)

( * ) Notice: Subject to any disclaimer, the term of this patent is extended or adjusted under 35 U.S.C. 154(b) by 222 days.

(21) Appl. No.: 13/768,821

(22) Filed: Feb. 15, 2013

(65) Prior Publication Data

US 2013/0162040 A1 Jun. 27, 2013

Related U.S. Application Data

(62) Division of application No. 12/925,201, filed on Oct. 15, 2010, now Pat. No. 8,519,863.

(51) Int. Cl.
| | |
|---|---|
| *H02J 4/00* | (2006.01) |
| *H05B 33/08* | (2006.01) |
| *H05B 37/02* | (2006.01) |
| *G05B 19/042* | (2006.01) |

(52) U.S. Cl.
CPC .............. *H02J 4/00* (2013.01); *G05B 19/0423* (2013.01); *H05B 33/0815* (2013.01); *H05B 37/0254* (2013.01); *Y10T 307/406* (2015.04); *Y10T 307/414* (2015.04)

(58) Field of Classification Search
CPC ........... H05B 33/0815; H05B 33/0827; H05B 33/0818; H05B 37/029; H05B 37/0254
USPC .............. 315/247, 291, 185 S, 307, 312–326, 315/209 R, 224, 225; 340/693.1, 693.4, 340/825.89, 310.01, 825.82, 825.44, 340/825.96, 825.94

See application file for complete search history.

(56) References Cited

U.S. PATENT DOCUMENTS

| | | |
|---|---|---|
| 3,646,538 A | 2/1972 | Frick |
| RE30,597 E | 5/1981 | Grindheim |
| RE30,603 E | 5/1981 | Grindheil |

(Continued)

FOREIGN PATENT DOCUMENTS

| | | |
|---|---|---|
| CN | 1864071 A | 11/2006 |
| CN | 1909048 A | 2/2007 |

(Continued)

OTHER PUBLICATIONS

Patent Cooperation Treaty, International Search Report and Written Opinion, May 17, 2012, 8 pages.

(Continued)

*Primary Examiner* — Tuyet Vo
(74) *Attorney, Agent, or Firm* — Kinney & Lange, P.A.

(57) ABSTRACT

A process instrument includes a transducer, a two wire interface, a microprocessor, a digital to analog converter, a first control circuit, and a second control circuit. A current passing through the two wire interface indicates a condition of the transducer. The microprocessor is interfaced with the transducer. The digital to analog converter receives a signal from the microprocessor indicating a current value. The first control circuit is coupled to the digital to analog converter and adapted to control the current passing through the two wire interface to the current value. The second control circuit is coupled to the digital to analog converter and supplies current to a secondary load.

20 Claims, 5 Drawing Sheets

(56) References Cited

U.S. PATENT DOCUMENTS

| | | |
|---|---|---|
| 4,325,399 A | 4/1982 | Frick |
| 4,502,003 A | 2/1985 | Frick |
| 4,804,958 A | 2/1989 | Longsdorf |
| 5,187,474 A | 2/1993 | Kielb et al. |
| 6,473,710 B1 | 10/2002 | Eryurek |
| 6,504,266 B1 | 1/2003 | Ervin |
| 2005/0030185 A1 | 2/2005 | Huisenga et al. |
| 2006/0028155 A1 | 2/2006 | Young |
| 2012/0091913 A1 | 4/2012 | Arntson |

FOREIGN PATENT DOCUMENTS

| | | |
|---|---|---|
| CN | 101351951 A | 1/2009 |
| CN | 202373271 U | 8/2012 |
| CN | 202677244 U | 1/2013 |
| DE | 102005063054 A1 | 7/2007 |
| JP | 11272215 A | 10/1999 |
| JP | 2004506972 A | 3/2004 |
| JP | 2010040213 A | 2/2010 |

OTHER PUBLICATIONS

Supplementary European Search Report dated Mar. 19, 2014, for corresponding European Patent Application No. 11832862.

English Translation of First Chinese Office Action dated Oct. 10, 2014, for corresponding Chinese Application No. 2011102877989.

DYNAMIC POWER CONTROL FOR A TWO WIRE PROCESS INSTRUMENT

CROSS-REFERENCE TO RELATED APPLICATION(S)

This divisional application claims priority from application Ser. No. 12/925,201, filed Oct. 15, 2010, entitled DYNAMIC POWER CONTROL FOR A TWO WIRE PROCESS INSTRUMENT, which is hereby incorporated by reference.

BACKGROUND

Many industrial process instruments operate on a two wire control loop with a current that varies from 4-20 mA based on a sensor reading or a desired actuator condition. In the case of a sensor, a host connected to the process instrument determines the measured value by measuring the control loop current. In the case of an actuator, the control room supplies a current to the process instrument which indicates a desired actuator condition.

The host is located in a control room and supplies approximately 24V DC to the two wire device. For a sensor, simple diagnostics can be accomplished by measuring an out of range current such as 3.5 mA or 20.5 mA. There may be as much as a mile or more of cable between the control room and the device causing a small voltage drop from the resistance of the wires. Electronics in the device regulate the voltage to a nominal value such as 12V to power a sensor and a microprocessor.

The microprocessor makes the sensor measurement and determines the necessary current value. It uses a digital to analog converter (DAC) to control a control amplifier and control transistor to consume current through a shunt resistor such that the total current draw of the electronics and the shunt resistor is the proper value. A feedback loop is completed using a high precision sense resistor that measures the total current usage of the process instrument to be sure an accurate value is reported.

Traditional design techniques for process instruments specified that only functions which could be accomplished with the minimum current (3.5 mA) would be implemented. This is due to the nature of the environment in which a process instrument operates. These devices are very low power, often installed in remote locations, and could bring entire operations to a halt if they fail. Therefore, it is essential that the process instrument be fully functional at the lower limit of the available power.

Although the device must operate at 3.5 mA, it may be operating as high as 20 mA. This means that 16.5 mA or more of available power is being thrown away in the shunt resistor.

One use for this current is to provide LED backlighting for the process control instrument. A past approach to provide this feature was to replace the shunt resistor with an LED. While this does provide for backlighting, there is no control of the intensity of the backlight. At 4 mA, the backlighting is dim, while at 20 mA, it can be overly bright.

SUMMARY

A method for controlling power consumption for the process instrument includes determining a desired total power consumption for the process instrument and calculating a value for a control signal related to the desired total power consumption. The control signal is supplied to a primary power control circuit and a secondary power control circuit. Using the secondary power control circuit, power consumption of a secondary load is adjusted to a portion of the desired total power consumption. Using a primary power control circuit, power dissipation in a shunt resistor is adjusted to cause the total power consumption for the process instrument to equal the desired total power consumption.

A process instrument comprises means for determining a total power consumption for the process instrument based, at least in part, on a process variable measured by the process instrument. The process instrument further includes means for adjusting power consumed by a secondary load to a portion of the desired total power consumption, and means for adjusting power dissipated in a shunt resistor to cause the total power consumption for the process instrument to equal the desired total power comsumption.

DETAILED DESCRIPTION

Figure 1:
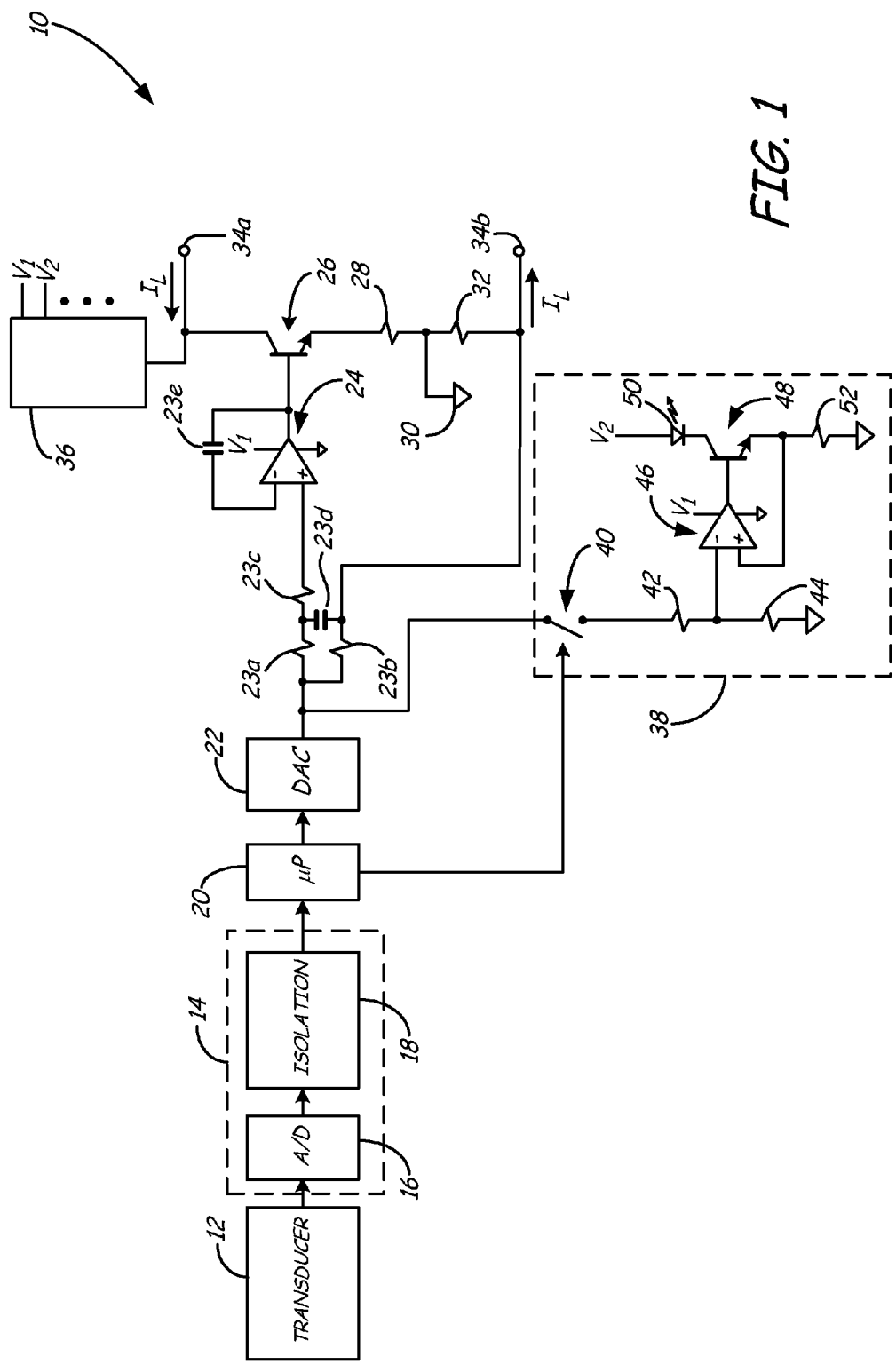
FIG. 1 is a diagram of a process instrument including a second control amplifier for driving a secondary load.

According to one embodiment, FIG. 1 is a diagram of process instrument 10 including a second control amplifier for driving a secondary load. Transducer 12 is connected to transmitter electronics 14. Transmitter electronics 14 may include components such as A/D converter 16 and isolation 18 to condition the output of transducer 12 to be read by microprocessor 20. Microprocessor 20 determines the necessary total loop current based on the process variable measured by transducer 12 and provides a signal to digital-to-analog converter (DAC) 22 correlated with the appropriate total loop current. For a 4-20 mA loop current, typical DAC output values are 1-3V. The output of DAC 22 is connected through feedback circuitry 23 to control amplifier 24.

Feedback circuitry 23 includes resistors 23a-23c and capacitors 23d-23e. Resistors 23a and 23b are connected to DAC 22. Resistor 23a is also connected to resistor 23c and capacitor 23d. The opposite terminal of capacitor 23d is connected to resistor 23b. Resistor 23c is connected to the non-inverting input of control amplifier 24. Capacitor 23e is connected between the inverting input and the output of control amplifier 24.

The output of control amplifier 24 is connected to control transistor 26. Control transistor 26 is connected to shunt resistor 28. Shunt resistor 28 shares ground contact 30 with sense resistor 32. Sense resistor 32 is connected back to resistor 23b and capacitor 23d to complete the feedback loop for controlling the loop current ($I_L$). Terminals 34a and 34b are connected to control transistor 26 and sense resistor 32 respectively. Power subsystem 36 is also connected to terminal 34a and provides the necessary circuitry to regulate and provide the power supply rails used by process instrument 10 (for example 10-15V, 4V, 3V, etc).

Together, feedback circuitry 23, control amplifier 24, and control transistor 26 form a primary power control circuit for adjusting power dissipated in shunt resistor 28. Alternatively, this primary power control circuit may be a number of other analog control circuits understood by those skilled in the art.

Pursuant to this embodiment, secondary load 38 is connected to the output of DAC 22. Switch 40 is included in some embodiments to allow microprocessor 20 to enable or disable secondary load 38 as necessary. DAC 22 is connected to a voltage divider comprising resistors 42 and 44. The voltage divider is connected to control amplifier 46 which is connected to control transistor 48. Control amplifier 46 and control transistor 48 form a secondary power control circuit for adjusting power consumed by a secondary load. Alternatively, this secondary power control circuit may be a number of other analog control circuits understood by those skilled in the art.

In this embodiment, the secondary load is one or more LEDs 50 (for simplicity only one LED is drawn). Control transistor 48 is connected to the positive voltage rail (4V in some embodiments) through LEDs 50 and to ground through resistor 52. LEDs 50 can be used as a backlight for a display on the process instrument and are one example of a secondary load.

In a minimum power scenario, process instrument 10 requires a base current requirement of 1.5-2.7 mA to operate transducer 12 and microprocessor 20. This means that as little as 0.8-2 mA of additional current must either be discharged through shunt resistor 24 or used for a secondary load such as LEDs 50. In a maximum power situation, this increases to as much as 19 mA.

Secondary load 38 allows the control of the current through LEDs 50 to be regulated independently. Secondary load 38 accepts the primary analog control signal from DAC 22 to allow independent control of the current through LED 50s. This allows LEDs 50 to be operated with a controlled intensity for minimizing flickering. LEDs 50 can also be selectively turned on and off based on measured conditions, a fault condition, available power, or a command from a user interface on the process instrument.

Independent control of excess available power offers additional advantages for a two wire process instrument. In the past, the design philosophy for two wire process instruments was that if a function could be done at minimum power (3.5 mA less the minimum required base current of 1.5-2.7 mA), then it would not be done at all. This invention allows for the selective control of a secondary subsystem to use available power for increased functionality and processor speed as desired, and can be extended to handle many additional non-critical loads.

The described architecture allows a design time decision to route a pre-determined portion of the loop current that would otherwise be discharged in shunt resistor 28 to the secondary load. For example, assume a LED current of 1-6 mA is desired for a loop current of 4-20 mA. A resistance of 5 ohms is selected for resistor 52 yielding an input voltage range for control amplifier 46 of 5-30 mV. The output of DAC 22 for a 4-20 mA loop current is 1-3V. Values for resistors 42 and 44 may be 95 k ohms and 5 k ohms, respectively, to yield the desired LED current.

This approach offers many benefits. LEDs 50 can be turned on and off selectively. In some embodiments, LEDs 50 may be enabled only at certain loop currents. Intensity can be controlled using pulse width modulation of switch 40. Switch 40 can also be used to flash LEDs 50 to indicate an error condition.

While a process instrument may have a range of 4-20 mA, the process variable will often be in the middle of its range. Previous designs have focused on providing functionality which could only be accomplished at minimum loop currents. Here, the secondary system can be selectively enabled at typical higher operating currents and disabled at lower loop currents. This allows process instrument 10 to selectively invoke additional functionality when it is possible to support those tasks.

The LED current is automatically regulated through DAC control making it transparent to microprocessor 20 and the remaining circuitry in process instrument 10. This eliminates flickering that might be caused by scavenging power from shunt resistor 28. Failure modes are benign as the LED circuitry is separated from the main process instrument current control loop. This avoids altering a critical part of the circuitry for process instrument 10 (shunt resistor 28). Intrinsic safety (IS) problems are avoided by maintaining existing shunt circuit designs.

A typical use for an LED is as a backlight on a display attached to process instrument 10. This architecture allows for the LED to be added as an optional display module without altering the remainder of the circuitry. Excess power is typically dissipated in shunt resistor 28. Modifying the shunt traces and resistor element to accommodate an accessory module causes intrinsic safety (IS) issues that require significant design, validation, and certification effort. This construction avoids that problem by retaining the existing shunt circuit designs and does not require the shunt traces to be routed into the display module to allow for the accessory lighting.

Figure 2:
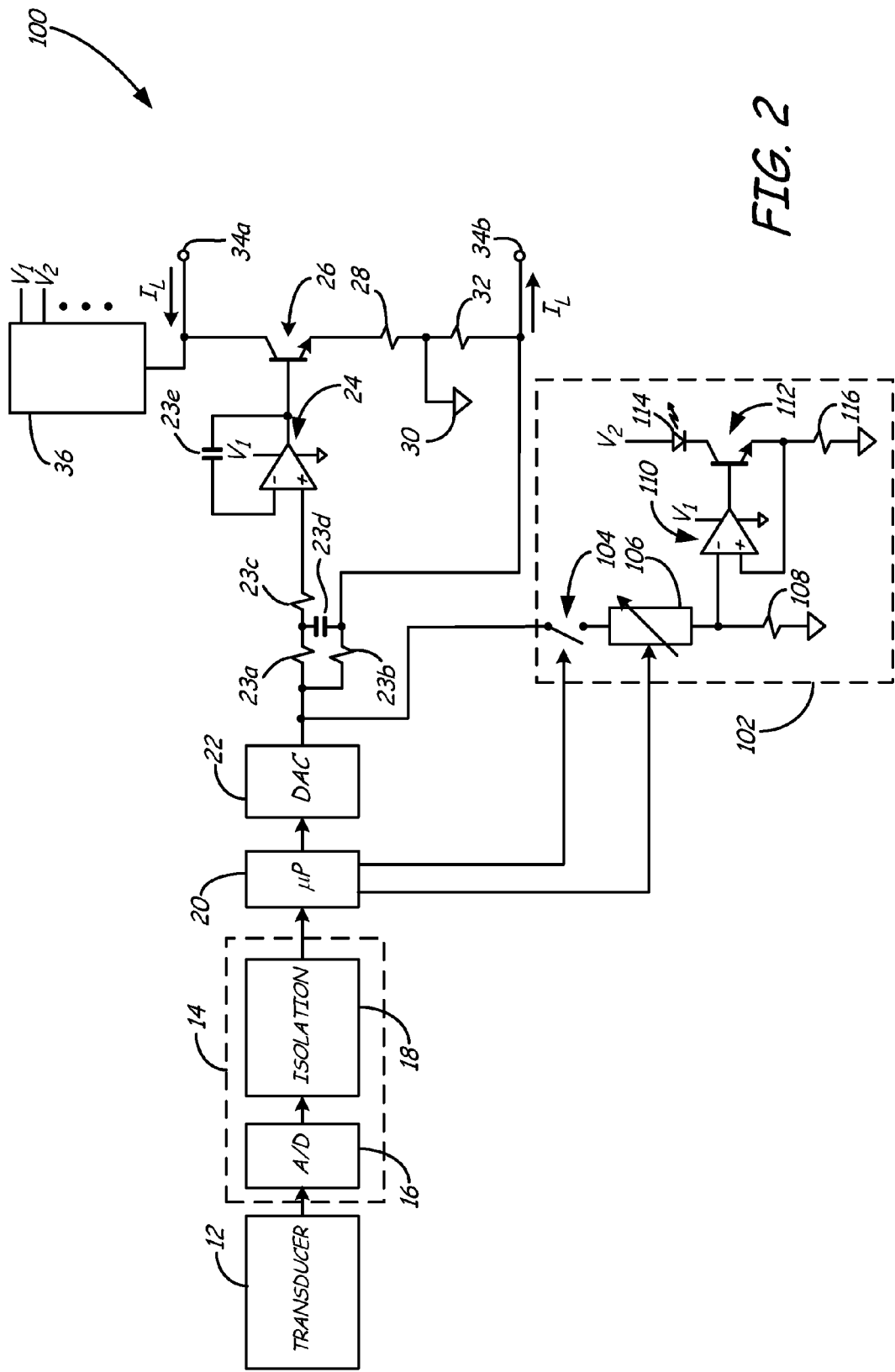
FIG. 2 is a diagram of a variation of the process instrument of FIG. 1 including a second control amplifier with an adjustable gain for driving a secondary load.

According to another embodiment, FIG. 2 is a diagram of process instrument 100 which is a variation of process instrument 10 (of FIG. 1) that includes an adjustable gain for driving the secondary load. Similar reference numerals are used in FIG. 2 to designate similar elements to those shown in FIG. 1. Secondary load 102 is connected to the output of DAC 22 through switch 104. Switch 104 is connected to variable resistor 106. Microprocessor 20 controls both switch 104 and variable resistor 106. Together with resistor 108, variable resistor 106 forms a voltage divider at the input of control amplifier 110. Control amplifier 110 is connected to control transistor 112. Control transistor 112 is connected to the positive voltage rail through LEDs 114 and to a ground contact through resistor 116.

As current flows through LED 114, control transistor 112, and resistor 116, a voltage will be present on resistor 116. The feedback loop to control amplifier 110 will ensure that the voltage on resistor 116 matches the voltage on resistor 108. By altering the value of variable resistor 106, the operation of the voltage divider and the voltage drop on resistor 108 at any given output of DAC 22 will change. In this way, microprocessor 20 can control the current through the secondary load. In the case of an LED as the secondary load, this adjustment may be used for dimming.

Figure 3:
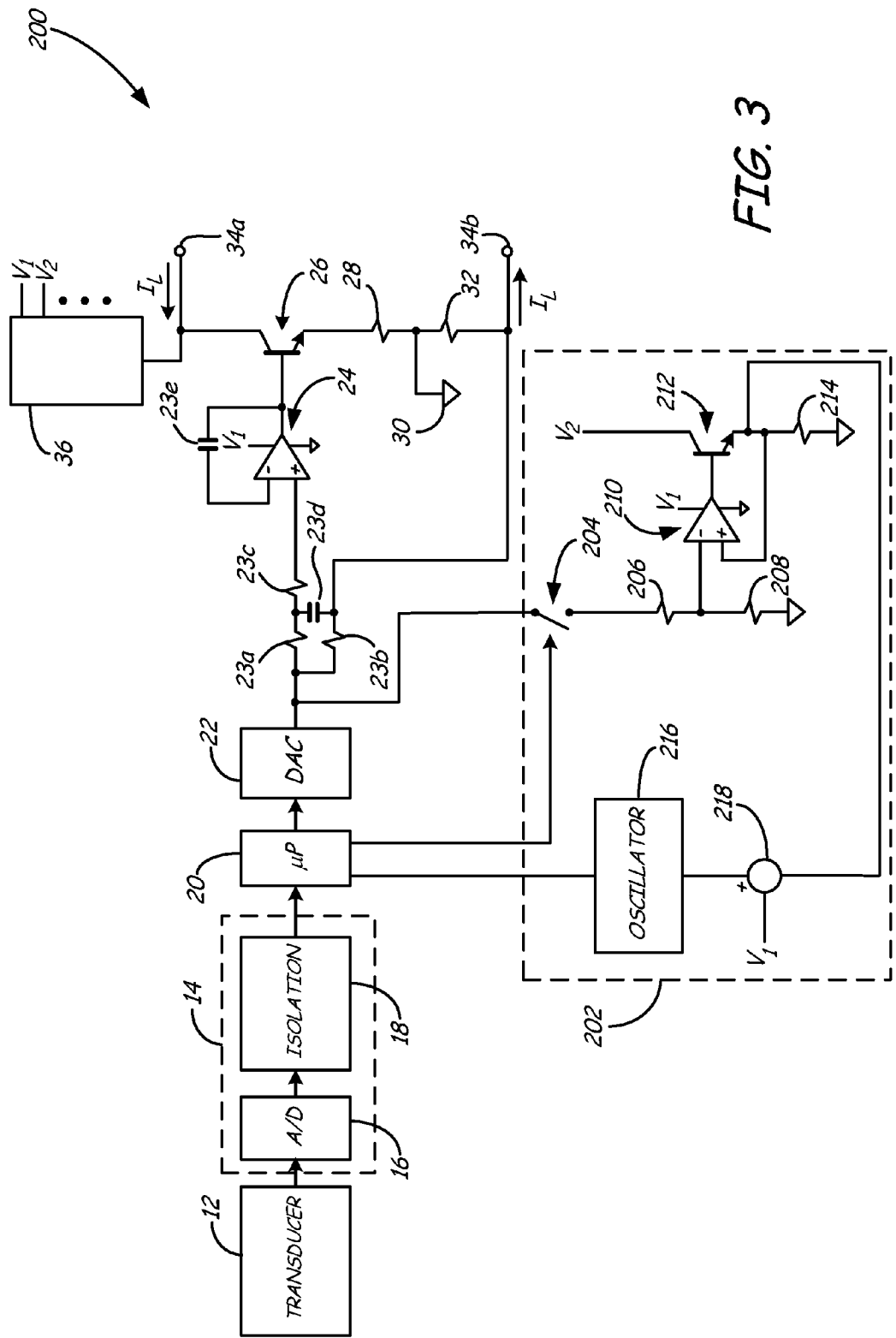
FIG. 3 is a diagram of a variation of the process instrument of FIG. 1 including a second control amplifier for increasing the clock speed of the microprocessor.

FIG. 3 is a diagram of process instrument 200 which is a variation of process instrument 10 (of FIG. 1) that includes a second control amplifier for increasing the clock speed of the microprocessor. Similar reference numerals are used in FIG. 3 to designate similar elements to those shown in FIGS. 1 and 2. Secondary load 202 is connected to the output of DAC 22 through switch 204. Switch 204 is controlled by microprocessor 20 and connected to the voltage divider created by resistors 206 and 208. Control amplifier 210 is connected to the voltage divider at the input and control transistor 212 at the output. Control transistor 212 is connected to a positive voltage rail and to ground through resistor 214. The operation of the feedback circuit for the secondary load is the same as that described for the embodiments of FIGS. 1 and 2.

Voltage controlled oscillator 216 provides a clock for microprocessor 20. Its voltage input is summer 218 which adds the voltage of a positive rail with that of the output of the secondary load control circuit. When the secondary load is enabled, the voltage at oscillator 216 increases which in turn increases the clock speed. This allows microprocessor 20 to selectively increase its processing power based on the loop current. When more power is available, microprocessor 20 can take on additional tasks by increasing its processing capabilities.

Figure 4:
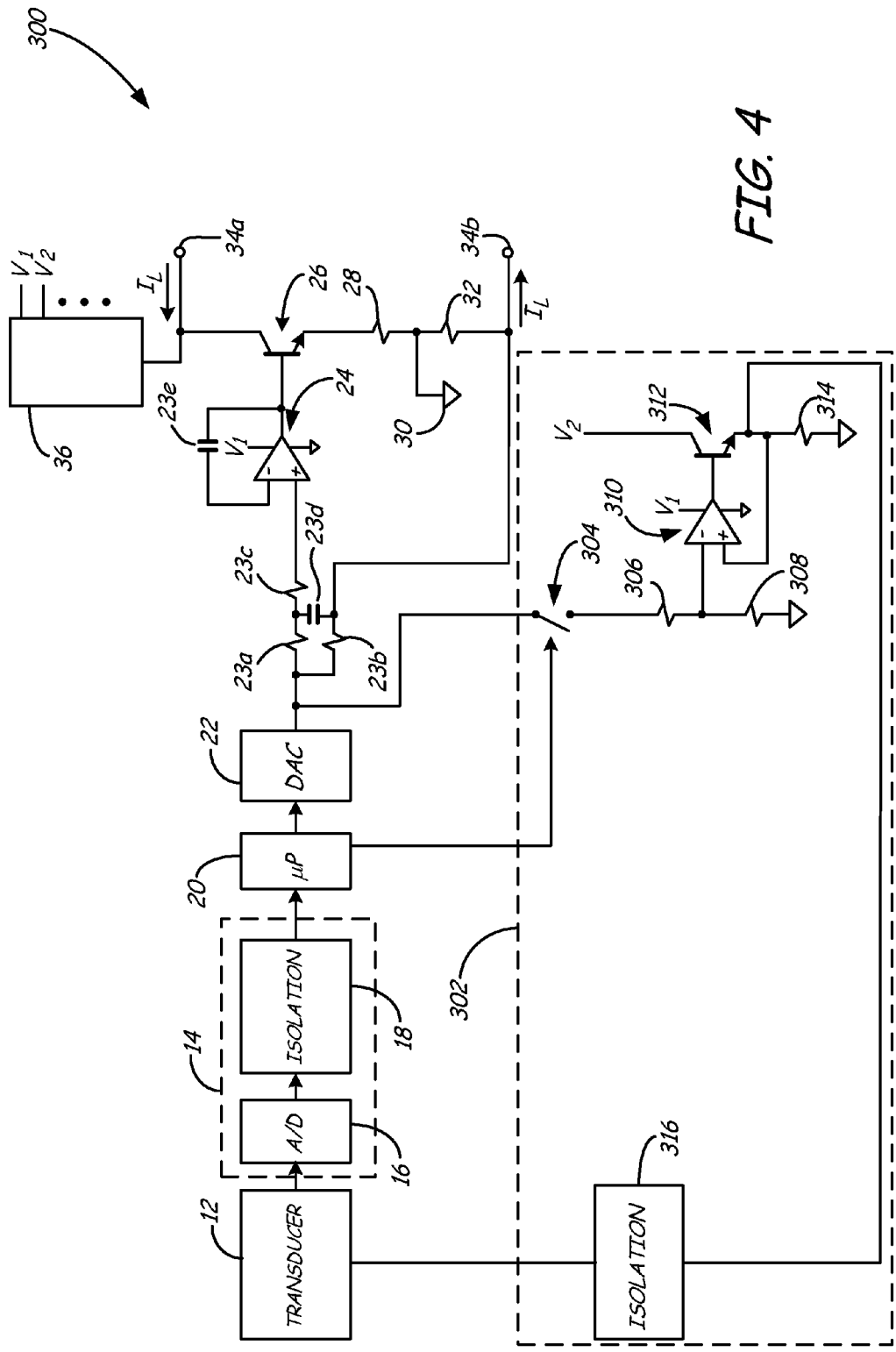
FIG. 4 is a diagram of a variation of the process instrument of FIG. 1 including a second control amplifier for increasing the power supplied to the transducer.

FIG. 4 is a diagram of process instrument 300 which is a variation of process instrument 10 (of FIG. 1) that can provide additional power to the transducer. Similar reference numerals are used in FIG. 4 to designate similar elements to those shown in FIGS. 1-3. Secondary load 302 is connected to the output of DAC 22 through switch 304. Switch 304 is controlled by microprocessor 20 and connected to a voltage divider created by resistors 306 and 308. This voltage divider is connected to control amplifier 310. Control amplifier 310 is connected to control resistor 312. Control resistor 312 is connected to a positive voltage rail and to ground through resistor 314. The operation of this control circuit is identical to that described with respect to FIGS. 1-3.

Resistor 314 is also connected through isolation 316 to transducer 12. This allows microprocessor 20 to selectively supply additional power or activate subsystems such as heaters within transducer 12. Purposes for doing so include maintenance of, or to complete advanced diagnostics on transducer 12. This architecture allows the power supplied to transducer 12 to be increased based on the loop current or to supply the power under certain conditions such as a threshold loop current.

Figure 5:
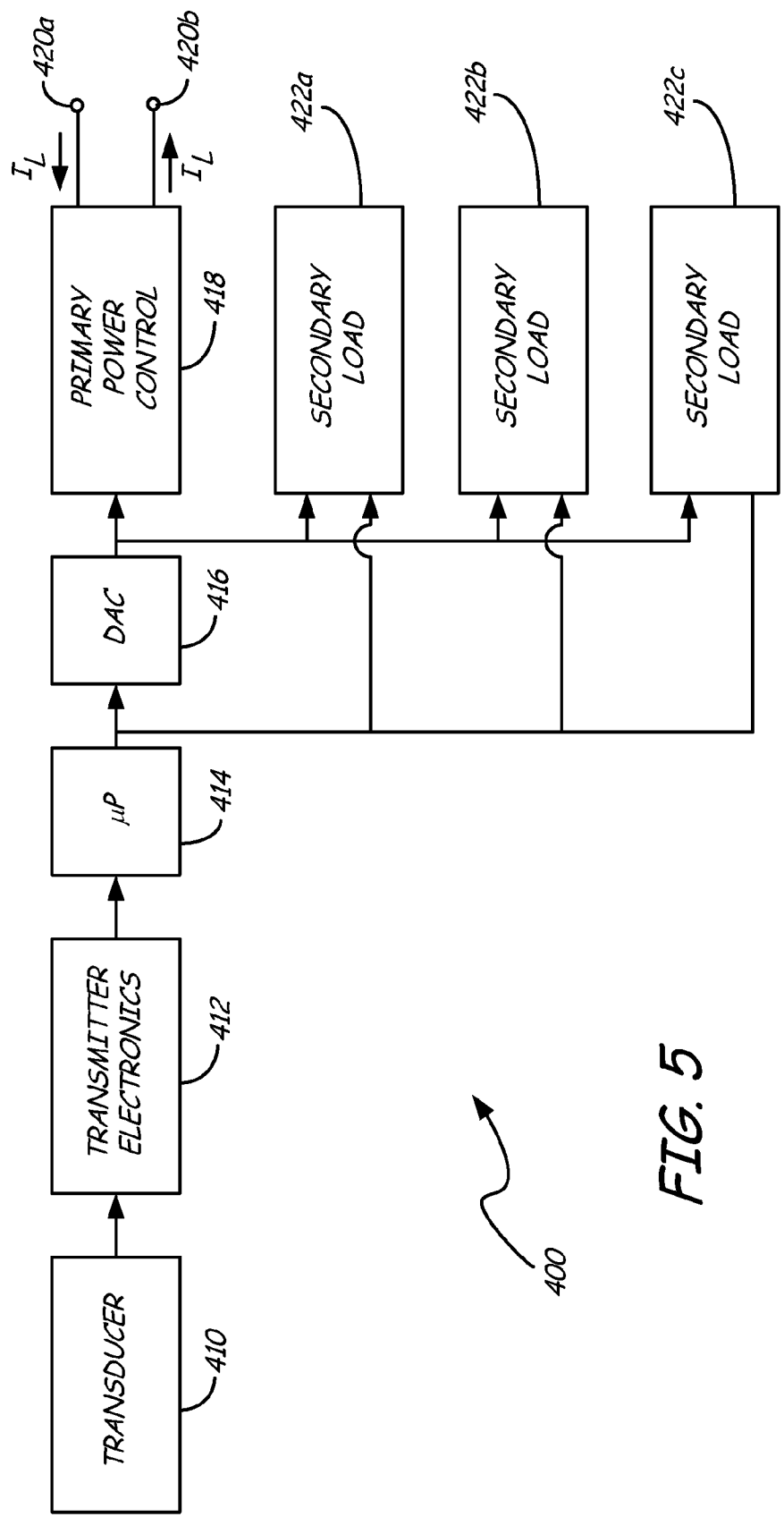
FIG. 5 is a block diagram of a process instrument including multiple secondary loads.

Pursuant to another embodiment, FIG. 5 is a block diagram of process instrument 400 including multiple secondary load subsystems. Transducer 410 is connected to transmitter electronics 412. Transmitter electronics 412 is connected to microprocessor 414 which is in turn connected to DAC 416. DAC 416 is connected to primary power control circuitry 418. Primary power control circuitry 418 is connected to terminals 420a-420b. Secondary loads 422a-422c are each connected to DAC 416 and microprocessor 414. In this way, any number of secondary loads can be connected to process device 400 and selectively enabled individually or collectively by microprocessor 414 during operation.

The described embodiments for the secondary load are only illustrative. Any number of possible secondary loads may be used. Further, any number of secondary loads may be included in a single process instrument. The independent control of secondary subsystems such as LEDs for backlighting or increasing processor power for additional tasks allows the process instrument to provide additional functionality.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for controlling power consumption of a process instrument comprising:
   determining a desired total power consumption for the process instrument;
   calculating a value for a control signal related to the desired total power consumption;
   supplying the control signal to a primary power control circuit;
   supplying the control signal to a secondary power control circuit;
   adjusting a power consumption of a secondary load, using the secondary power control circuit, to a portion of the desired total power consumption; and
   adjusting a power dissipation in a shunt resistor, using the primary power control circuit, to cause the total power consumption for the process instrument to equal the desired total power consumption.

2. The method of claim 1, wherein determining a desired total power consumption comprises:
   measuring an process variable using a sensor attached to the process instrument; and
   determining a desired total power consumption based on the measured process variable.

3. The method of claim 1, wherein the secondary load is increased power supplied to a microprocessor.

4. The method of claim 1, wherein the secondary load is one or more light emitting diodes.

5. The method of claim 1, wherein the secondary load is increased power supplied to a transducer.

6. The method of claim 1, wherein a microprocessor selectively enables and disables the supply of power to the secondary load.

7. A process instrument comprising:
   means for determining a desired total power consumption for the process instrument based, at least in part, on a process variable measured by the process instrument;
   means for adjusting power consumed by a secondary load to a portion of the desired total power consumption; and
   means for adjusting power dissipated in a shunt resistor to cause the total power consumption for the process instrument to equal the desired total power consumption.

8. The process instrument of claim 7, wherein the means for adjusting power consumed by a secondary load includes a secondary power control circuit coupled to a digital to analog converter.

9. The process instrument of claim 7, wherein the means for adjusting power dissipated in a shunt resistor includes a primary power control circuit coupled to a digital to analog converter.

10. The process instrument of claim 7, wherein the secondary load comprises light emitting diodes, and wherein the process instrument further comprises a display and the light emitting diodes are configured as a backlight for the display.

11. The process instrument of claim 7, wherein the secondary load comprises a voltage controlled oscillator coupled to the microprocessor.

12. The process instrument of claim 7, wherein the secondary load comprises the transducer.

13. The process instrument of claim 7, wherein the means for adjusting power consumed by a secondary load comprises a switch coupled to the microprocessor configured to enable or disable the supply of current to the secondary load.

14. The process instrument of claim 7, wherein the means for adjusting power consumed by a secondary load includes an adjustable gain element operable by the microcontroller to adjust the amount of current supplied to the secondary load.

15. The process instrument of claim 7, wherein the means for determining a desired total power consumption includes a microprocessor.

16. The process instrument of claim 15 and further comprising:
   a transducer that provides a signal representative of the process variable to the microprocessor;
   a two wire interface wherein a current passing through the two wire interface indicates a measurement of the process variable;
   a digital to analog converter that receives a signal from the microprocessor indicating a current value.

17. The process instrument of claim 16, wherein the means for adjusting power dissipated in a shunt resistor comprises:
   a first control amplifier coupled to the digital to analog converter;
   a first control transistor coupled to the first control amplifier;
   a shunt resistor coupled to the first control transistor; and
   a sense resistor coupled to the shunt resistor and the first control amplifier.

18. The process instrument of claim 16, wherein the means for adjusting power consumed by a secondary load comprises:
   a second control amplifier coupled to the digital to analog converter;
   a second control transistor coupled to the second control amplifier; and
   a first resistor coupled to the second control transistor and the second control amplifier.

19. The process instrument of claim 18, wherein the means for adjusting power consumed by a secondary load further comprises:
   a second resistor coupled between the digital to analog converter and the second control amplifier; and
   a third resistor coupled between the second control amplifier and a ground reference.

20. The process instrument of claim 19, wherein at least one of the second and third resistors is an adjustable resistor controlled by the microprocessor.

\* \* \* \* \*